Oct. 4, 1955  E. A. PATTON ET AL  2,719,328
METHOD FOR MAKING CELLULOSIC BOARD
Filed Oct. 7, 1950  2 Sheets-Sheet 1
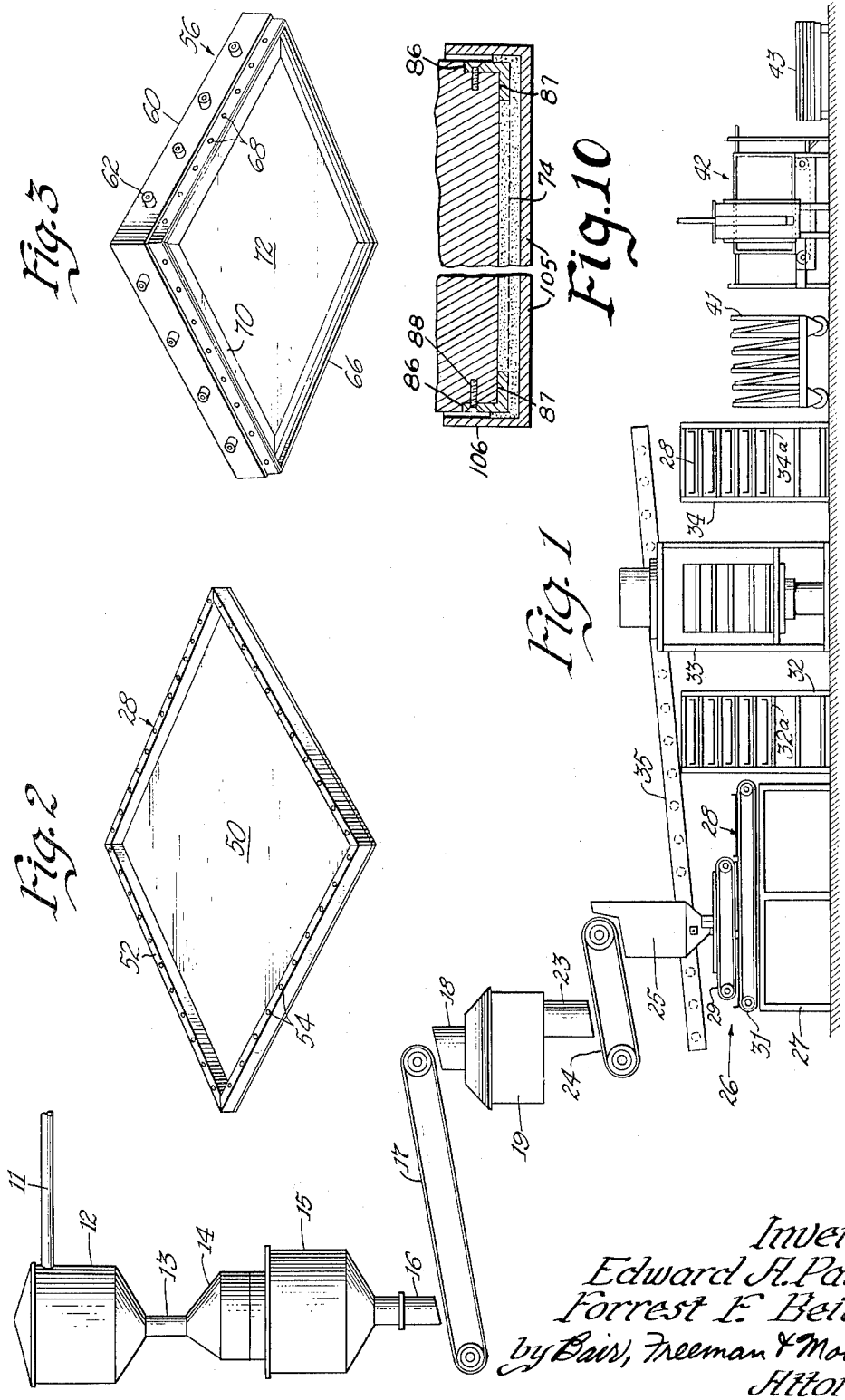
Inventors
Edward A. Patton
Forrest F. Beil
by Bair, Freeman & Molinare
Attorneys

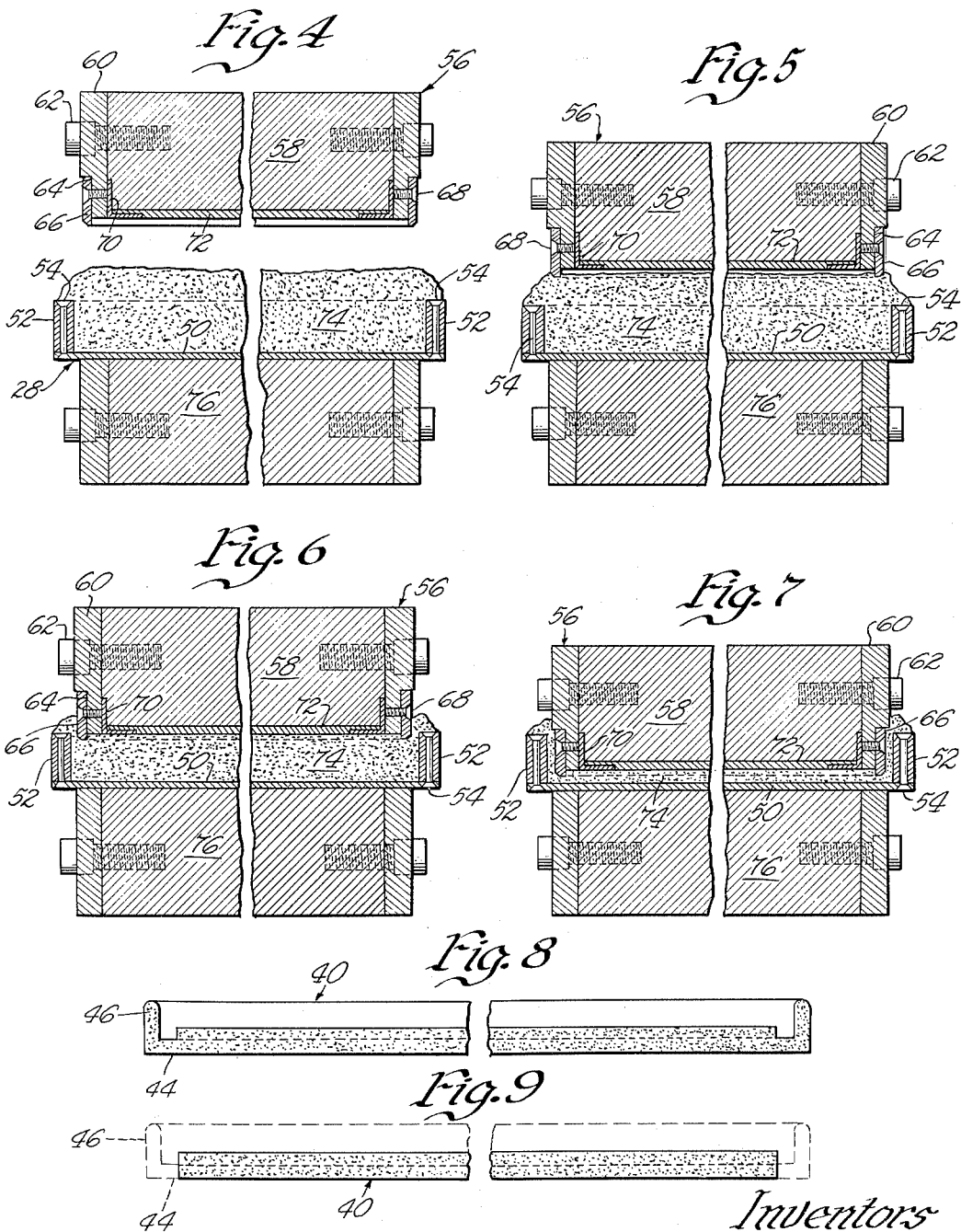

United States Patent Office 2,719,328
Patented Oct. 4, 1955

2,719,328

METHOD FOR MAKING CELLULOSIC BOARD

Edward A. Patton and Forrest F. Beil, Clinton, Iowa, assignors to Curtis Companies Incorporated, Clinton, Iowa, a corporation of Iowa Application October 7, 1950, Serial No. 189,012

5 Claims. (Cl. 18—47.5)

This invention relates to method and apparatus for compressing granular cellulosic material to form boards and the like.

Reference is made to our copending application entitled "Method for Making Cellulosic Board" (filed September, 1950, Serial No. 184,888, now Patent No. 2,618,813). This application shows a method for manufacturing from disintegrated wood a cellulosic board characterized by high strength, freedom from warping and many other desirable properties. The method of said copending application involves subjecting a layer of mixed disintegrated wood and a resin-forming binder to heat and pressure. The margins of said layer are compressed to from 40% to 60% of the thickness of the compressed mixture within said margin.

As explained in our copending application, the dense margins formed by extra compression of the edges serve to hold water vapor in the granular material during the pressing operation and thereby makes possible the manufacture of a board or panel having uniform strength, rigidity and other characteristics from the center of the panel all the way to the edge. Such uniformity not only prevents warping or twisting, but is also an otherwise very desirable feature of the panels made by the method of said copending application.

The granular material disclosed in our copending application is quite loose and has air-filled voids between the granules making up the material. If such material is deposited in a pan or tray shaped container placed on the lower platen of a press, and if an upper press platen of simple columnar shape is rapidly lowered into compressing position, the granular material tends to be partly blown out of the container, apparently by air being rapidly displaced from the granular material in the container. The blowing out of granular material from the container by rapid downward movement of the upper press platen tends to leave in the container an amount of material insufficient to form a board of uniform desired density, apart from the difficulties encountered in the recovery of the material blown out of the container. In particular, the margins of the layer of molding mixture in the container tend to be blown out, with resultant deficiencies in molding material around the edges of the container.

In carrying out the present invention we employ press including an upper press platen having a marginal depending plate or bar extending continuously around the whole periphery of the press platen. This bar enters the lower pan-like container a short distance inside the upstanding side walls of the lower container and serves to confine in the lower container material which otherwise would be blown out of the container when the upper press platen is moved downwardly rapidly.

In said press, the above mentioned lower container may be provided with upstanding side walls of appreciable thickness. Thus, when there is deposited in the container a layer of loose material having a greater thickness than the depth of the container, such a layer will extend over the top surfaces of the side walls. The latter are made thick enough to insure that the deposited layer will be of uniform thickness inside the side walls, in spite of the fact that the layer in question extends above the side walls. In other words, a substantial portion of the sloping margins of the deposited thick layer extends above the top surfaces of the side walls.

The uniform filling of the container resulting from the use of said press contributes greatly to uniform density in the molded boards or panels.

It is therefore an important object of this invention to provide method for rapidly compressing a layer of a loose granular mixture having air-filled voids between the granules therein, without any blowing away of loose material by air displaced therefrom, to form a board of uniform density.

Other and further objects and features of this invention will become apparent from the following description and appended claims as illustrated by the accompanying drawings showing, by way of an example, apparatus for carrying out this invention and products made therein. More particularly:

Figure 1 is a diagrammatic side view of apparatus for effecting a complete process in the manufacture of boards from granulated wood including a press according to this invention;

Figure 2 is a perspective view of a pan or tray used as a mold in the apparatus of Figure 1;

Figure 3 is a perspective view from below of the upper press platen forming part of the press included in the apparatus of Figure 1;

Figure 4 is an enlarged vertical sectional view, with parts broken away, of the pan and press platen of Figures 2 and 3, with the material to be compressed disposed in said pan, the parts being shown in the positions assumed prior to compression;

Figure 5 is a view similar to Figure 4 showing the parts in the positions assumed in an initial stage of the compressing step wherein the depending bar of the upper press platen has barely contacted and entered into the material to be compressed;

Figure 6 is a view similar to Figures 4 and 5 by showing the press in a nearly completely closed position;

Figure 7 is a view similar to Figures 4 to 6 but showing the press in completely closed position;

Figure 8 is an enlarged sectional view of the compressed material after it has been removed from the pan; and Figure 9 is an enlarged sectional view of the material after it has been removed from the pan and the compressed edges cut off, the compressed edges being shown in dotted lines.

Figure 10 is a vertical section, with parts broken away, of a modified upper platen construction.

Referring specifically to Figure 1 for a description of apparatus for practicing the present invention, numeral 11 designates a conduit which conveys, for instance, wood waste from a dust collector system in a wood making plant. The wood waste may contain a high percentage of knot sections, say, 50% knot sections and 50% machine waste.

The refuse or waste is delivered by the conduit 11 to a cyclone 12, which is preferably equipped wth a magnetic separator (not shown) to remove any metal therefrom, which may cause sparks and possibly a fire. From the cyclone 12, the material is delivered through a conduit 13 to an ordinary commercial hammermill 14, which pulverizes or granulates the waste material and is equipped with a suitable screen (not shown) to deliver pulverized waste directly into a storage bin 15. This part of the process is continuous, the remainder being accomplished by a batch method. The storage bin 15 may be provided with an automatic shut-off device (not shown), which shuts off the delivery of waste through the conduit 11, when a predetermined level has been reached in the bin 15.

The pulverized material is fed through an outlet 16 from the bin 15 to a belt conveyor 17. A screw conveyor (not shown) is provided in the outlet conduit 16, and the belt conveyor 17 and screw conveyor are synchronized electrically by any suitable means to introduce a predetermined amount of pulverized material into a waste measure 18. An automatic water valve (not shown) delivers a predetermined amount of water to each measured batch of pulverized material that is delivered to a muller or mixer 19. A predetermined amount of powdered or liquid resin or other binder is added to each measured batch of pulverized material. After mulling, this mixture is then dumped onto a belt conveyor 24 through an outlet conduit 23, and is delivered to a hopper 25 of the pan filling machine.

From the hopper 25, the pulverized and mixed material is delivered to a belt system, which is generally indicated by the numeral 26. The entire pan filling machine (which may be the machine shown in the Baker et al. copending application Serial No. 117,634, filed September 24, 1949, now Patent No. 2,623,676) is supported on a table 27, and the pans which are filled by the machine are shown generally at 28. A continuous belt 29, and a second continuous belt 31, are provided for conveying the pulverized mixed material to the pans, and for conveying the pans to a loading rack 32, respectively. It will be noted that the loading rack is provided with a number of shelves or supports 32a for the pans 28. From the loading rack 32, the pans are delivered either by manual or mechanical means to a hot press generally indicated at 33. The hot press itself is of modified standard design, and pressure is applied to the material in the pans, and at the same time the material is heated. When the compression step is completed, the pans with the compressed material therein are delivered to the unloading rack 34, which likewise has a number of shelves 34a for the reception of the pans 28. The pans are then removed from the rack 34, either manually or mechanically, and the compressed material is taken out of the pans by inverting them. The inverted pans 28 are then placed on a gravity roller conveyor 35, which terminates adjacent the pan loading mechanism.

The compressed boards indicated at 40 are placed on edge in a cooling rack 41. After having been cooled, the boards are passed through a spray device generally indicated at 42 in which each board or panel is moved between opposed sets of spray nozzles. After the boards or panels have been sprayed with water, they are piled on a support to form a stack 43 in which the boards are left for a few hours. During this time the moisture distributes itself evenly through each of the boards or panels which are then ready for trimming and sanding.

Referring now to Figures 2 through 10 for a detailed description of the pans 28, the press platens cooperating therewith and the boards formed therein, the pan 28 is formed, preferably, of aluminum, because of its lightness and heat conductivity. Further, the aluminum is of fairly thick gauge and does not have too much tendency to warp when heated. Also, there is very little tendency for the compressed material to stick to the aluminum surface. Obviously, however, other metals may be used for the pans such as brass or iron.

The pan 28, preferably, comprises a flat base plate 50 to the margins of which bars 52 are attached, as by means of rivets 54. By way of an example, the base plate 50 may be made of a flat sheet of 1/8" aluminum 61ST alloy and the bars 52 may be made of the same alloy and may have a thickness of 3/8" and a height of 1".

The upper platen of the press 33 is generally indicated by the reference numeral 56. Although this platen may be made integral or of one-piece construction, the press platen illustrated in the drawings comprises a main body portion 58 and side plates 60 held to the main body portion by bolts 62 and projecting below the main body portion. Further, the side plates 60 have their outside lower margins rabbeted as indicated at 64, and one or more plates or bars 66 are seated in this rabbet, being held there by bolts 68 and projecting below the side plates 60. The bar or bars 66 extend around the whole upper press platen, and, if not integral, form substantially steamproof joints with each other. Further, the bars 66 form steamproof joints with the side plates 60. If the machining of the upper press platen parts is not accurate enough to prevent steam leaks, then an appropriate gasketing or sealing material, such as mastic, is deposited in the above mentioned joints to make the joints tight to steam.

The lower margins of the main press platen body portion 56 may be rabbeted, and a generally L-shaped flange 70 may be held in this rabbet. The other leg of the flange 70 projects inwardly over and spaced from the lower surface of the plate body 58 to hold thereagainst a plate 72 which contacts the material to be molded. The edges of the plate 72 may be rabbeted to receive the horizontal leg of the flange 70, so that the lower surfaces of this leg and of the plate 72 are flush.

The mixed granular material to be compressed in the pan 28 is shown in Figure 4 by the reference numeral 74. As shown, this layer has a depth greater than the height of the bars 52 forming erect side walls of the mold 28. The major portion of the sloping margins of this layer 74 extend above the upper surfaces of the bars 52.

The pan 28, when thus filled with granular material to be compressed, is disposed on the lower platen 76 of the press 33.

As shown in Figure 5, the lower edges of the bars 66 depending from the upper press platen first contact the upper surface of the layer 74 of granular material along a line approximately coinciding with the beginning of the marginal slope of the layer 74. Thus, inside the bars 66, the layer 74 is of uniform thickness. As the upper press platen descends further (see Figure 6) the downwardly projecting portions of the bars 66 confine the uppermost portion of the layer 74 therebetween to prevent blowing out of granular material while permitting displacement of granular material outside the bars 66. In the final stage of compression illustrated in Figure 7, the upper press platen has reached the lower limit for its stroke. As shown, the granular material has been subjected to a greater degree of compression between the opposed surfaces of the bars 66 and the bottom plate 50 of the mold 28, as compared with the layer of granular material inside the bar 66.

Figure 10 shows a modified upper platen construction in which the bars 66 employed in the constructions previously described have been replaced with angle iron members 87, secured to recesses 86 in the sides of the platens by means of screws 88. The depending peripheral flange 87, which is the horizontal portion of the angle iron, provides a greater sealing area than the bars 66 for the purpose of better confining the moisture within the pressing chamber.

When the compressed board 40 (shown in Figures 8 and 9) has been removed from the pan 28, the board 40 includes a thin flange 44 extending completely around the main portion of the board, being formed between the lower surfaces of the bars 66 and the opposed surface of the bottom plate 50. As shown, the thin flange or border 44 together with a slightly upturned edge 46 (formed between the insides of the bars 50 and the outsides of the bars 66) are removed to leave a board of uniform thickness. The portions 44 and 46 thus removed, for instance, by sawing, may then be returned to the waste or refuse material and repulverized.

The significance of the above disclosed pressing steps is explained as follows:

Since the margins of the layer being molded are compressed very much more than the remaining portions of the layer, the moisture content of the mixed wood and resin is maintained practically constant and uniform throughout the molding operation. In other words, the compressed margins or edges act as a seal to prevent the escape of moisture and the moisture content is kept uniform throughout the layer being molded. There is, therefore, no tendency to warping or curling after the molding operation has been completed due to uneven moisture loss with consequent greater shrinkage of areas of relatively great moisture loss. Further, at a temperature of at least 280° F., a pressure of at least 150 pounds per square inch and a moisture content of at least 5%, and when the pressure has been correlated with the moisture content as described hereinbelow, the wood particles are rendered plastic and flow so as to form a board characterized by low porosity, high strength and resistance against chipping, in spite of the relatively small amounts of resinous binder present in the board. In this connection, it should be mentioned that since the resinous binder flows under the temperature and pressure conditions maintained during the initial stage of the molding operation, the resinous binder is distributed over the wood particles in a manner that utilizes more fully the binding properties of the resin. Finally, when the moisture content has been correlated with the pressure as disclosed hereinbelow, there is little or no tendency to blister when the pressure is released slowly. Pressure must be maintained at least long enough to cause both the wood particles and the resin to flow into the positions characteristic of the final board but the pressure may be reduced slowly and water vapor released, if desired, before the resin is completely cured as long as the moisture is retained for a sufficient period to plasticize the wood particles for flow into their final positions. The pressure is kept below 500 lbs. per square inch, since otherwise the wood particles will be at least partly hydrolyzed or changed chemically, as evidenced by darkening, lessened ability to absorb oil stains, and other undesirable changes. Further, at pressures of 500 lbs. per square inch or higher, the boards tend to blister on release of pressure, even when such release is carried out slowly.

The board or sheet material prepared according to said method is characterized by high strength, cohesiveness (no tendency toward chipping or to the breaking off of small particles, particularly at edges), uniform physical characteristics (strength, rigidity, and the like) from the center of the board or sheet all the way to the edge, freedom from warping, a tendency to swell at humidities higher than normal, if at all, principally in a direction normal to the plane of the board, a hygroscopicity no higher than ordinary wood, resistance against bending, ability to take paint and other finishes in the same manner as ordinary wood and a capacity for being sawed, nailed, screwed or planed.

The following materials have been found to provide a very satisfactory panel formed of compressed wood or other cellulose type material. Disintegrated wood of any species of tree may be used. Very satisfactory results have been obtained with pine wood. Preferably at least 50% of the wood is disintegrated to a 16 to 40 mesh particle size.

The resin employed is preferably one having a flow point not higher than 125° C. The resin may be a thermosetting resin capable of flowing for an appreciable period of time before it is cured or set in the press and capable of acting as a bonding agent for the wood particles. We prefer to use a resin having a curing time of from 40 to 100 seconds at 150° C. Resins of various chemical compositions share these characteristics. We can use, for instance, resins of the phenolformaldehyde type or the urea-formaldehyde type, or furfural resins and the like. Obviously, resins characterized by excessive tendency to absorb water or by insufficient resistance to weathering agents or having other undesirable characteristics should not be employed.

We have successfully used, inter alia, three phenolformaldehyde resins characterized by the following flow points and cure times:

| Resin | Seconds Cure at 150° C. | Flow Point, ° C. |
|---|---|---|
| A | 80-100 | 110-125 |
| B | 45 | 85-90 |
| C | 55-65 | 95-105 |

It is understood that the thermosetting resins herein referred to are capable of curing or setting under the conditions of the molding operation. In other words, the binding agents employed may or may not be resinous when initially incorporated with the granulated wood but are definitely present as resins in the finished panels. We may therefore employ binding compositions made up of resin-forming materials in any resin-forming stage short of the final or cured or set stage. The resinous binding agent may be employed in wet or dry condition. We prefer to use a solid finely pulverized resin-forming composition, since such products are most easily and most uniformly blended or mixed with the wood particles. Nevertheless, we can also employ moist or dissolved or dispersed resin-forming compositions, due regard then being had for the moisture content of the resin-forming composition when making up the mixture to be molded.

The amount of resin employed may range upwardly from 4% to 5% of the mixture being molded. We prefer to employ from 5% to 8% resin. When a dry powdered phenolformaldehyde resin is used, very satisfactory results have been obtained at a resin content of from 6% to 7%. Blistering occurs at resin contents of about 14% or higher, for such high resin contents apparently prevent the free escape of steam from the resulting dense boards when the press is opened. W prefer to keep the resin content at from 5% to 8%, to keep the cost at a minimum. Obviously, the exact amount of resin to be used will vary somewhat according to the specific nature of the particular resin being used. In general, more resin is used when the wood is more finely disintegrated.

The water content of the molding mixture is maintained at from 5% to 25%, depending on the pressure employed in the molding operation. At lower moisture contents, the panels obtained are characterized by excessive thickness, structural weakness, excessive porosity, the presence of voids in the interior of the panel and by pitted surfaces, even when relatively high pressures are used. At moisture contents in excess of 25% there is a tendency for the panels to stick or adhere to the mold walls and to the formation of blisters or even to explosive disintegration of the panel on release of the pressure, whether or not such release is accomplished slowly, if sufficient pressure has been used to form a firm panel. The correlation between the moisture content and the pressure is discussed hereinbelow. Wood waste accumulated from millwork operations commonly contains about 6 to 8% moisture. This moisture content is taken into account when the total moisture content of the pressing mixture is calculated.

It should be understood that besides the above enumerated ingredients, other materials may also be incorporated with the molding mixture. Such added material may include pigments such as titanium dioxide, iron oxides and the like, inert fillers such as chalk or barium sulfate, materials commonly used as fillers or extenders for resins, finely divided carbon and many other materials.

The above disclosed ingredients of the molding mixture are mixed with each other at a temperature below the flow point of the resin.

The pressure applied during the hot molding operation ranges from 150 to 400 pounds per square inch or higher but does not exceed 500 pounds per square inch. The pressure is correlated with the moisture content of the molding mixture according to the following table:

| Pressure in Pounds per Square Inch | Broad Range, percent | Moisture Content Preferred Range, percent | Example, percent |
| --- | --- | --- | --- |
| 150 | 20–25 | 22–25 | 25 |
| 200 | 15–25 | 17–23 | 20 |
| 300 | 10–20 | 12–18 | 15 |
| 400 | 5–15 | 7–13 | 10 |
| 450 | 5–10 | 5–8 | 7 |

The correlation between the moisture content of the molding mixture and the pressure may also be tabulated as follows:

| Moisture Content in Percent | Pressure in Pounds Per Square Inch | |
| --- | --- | --- |
| | Minimum | Maximum |
| 20–25 | 150 | 200 |
| 15–20 | 200 | 300 |
| 10–15 | 300 | 400 |
| 5–10 | 400 | 500 |

The exact pressures and moisture contents to be employed will vary, within the tabulated limits, according to a number of factors such as the thickness, strength and density required or desired in the finished panel. Obviously, these characteristics vary according to the end use of the finished panel. Further, moisture contents and pressures will vary somewhat, within the tabulated limits, according to the nature and prior preparation of the wood, the nature and amount of specific resin employed, and like factors. In making panels suitable for most, if not all purposes, on a large scale, we prefer to use a molding mixture containing from 10 to 15% moisture, and to press this mixture at from 300 to 400 pounds per square inch, using a powdered phenol-formaldehyde resin as binding agent in an amount ranging from 5 to 8%. Thus, a batch of material to be molded may have the following composition:

86.3% by weight of pulverized mill waste
7.7% by weight water
6.0% by weight powdered phenol-formaldehyde resin having a flow point of 110°–125° C. and a cure time of 80–100 seconds at 150° C.

As explained hereinabove, the pressure is at least sufficient, at the prevailing moisture content and temperature, to cause the wood to be plasticized and at the same time not great enough to cause blistering when the pressure is released slowly.

The temperature of molding is at least 280° or 300° F. A temperature of 338° F. insures very satisfactory results with the above disclosed specific mixture. In general, the temperature must be sufficient to bring about curing or setting of any thermosetting resin employed. The time of molding should be sufficient to bring about curing or setting at the prevailing temperature. Ordinarily, from about 3½ to 10 minutes molding time is sufficient. With the above disclosed specific mixture, a molding time of 5 minutes has been found satisfactory. The full pressure should be applied at the beginning of the molding operation, to insure flow of resin before the resin is cured or set. When longer molding times and higher temperatures are employed, the resulting panel material will be more stable dimensionally under varying humidity conditions, i. e. the material is less hygroscopic.

The pressure is applied for a period of time to compress the layer of molding mixture to its final dimensions. If desired, the full pressure can be applied throughout the whole molding operation, although very good results have also been obtained by slowly reducing the pressure to a lower value as soon as complete compression has been effected.

The molds may be coated with magnesium stearate to prevent adherence. For the same purpose, the molds may be preheated, say, to 150° to 175° F. before the press mixture is introduced.

In the molding operation, the margins on the layer being compressed are compressed to about 40% to 60% of the thickness of the middle portions of the finished panel. Some warping tendency is evident if the margins are compressed to less than 60% of the thickness of the remainder of the board. Wood cannot be compressed to less than about one-third of its original thickness. Hence, when the edges or margins have been compressed to about one-third of the thickness of the remaining portions of the panel, these margins act as stops preventing further compressing of the middle of the panel. Preferably, the margins are compressed to about 45% to 55% of the thickness of the middle portions of the panel. In the case of the above disclosed specific mixture, very satisfactory results have been obtained by compressing the margins to one-half of the thickness of the remaining portions of the panel. In the case of a panel 4 ft. square, compressed margins 1″ wide function very satisfactorily to seal the moisture content of the pressing mixture.

To prevent darkening, either of the whole panel (excluding the densified sealing edge or margin) or parts thereof, and to permit uniform absorption of oil stains and the like, the pressing operation is conducted so that no significant decomposition or other chemical changes are effected in the wood particles during the pressing step. For this purpose, the molding pressure is kept below 500 pounds per square inch and the full molding pressure is applied for less than 10 minutes, at least when the pressure ranges between 400 and 500 pounds per square inch. At pressures below 400 pounds per square inch, the pressure may be applied for longer periods than 10 minutes. Finally, the temperature is also kept below levels causing discoloration of the wood and reduced stain absorption. More particularly, temperatures up to about 360° F. are safe at pressures below 500 pounds per square inch applied for less than 10 minutes. At pressures less than 400 pounds per square inch, temperatures higher than 360° F. may be used, say, up to 400° F. However, as long as the flow point of the resin-forming binder is exceeded by about 80° to 100° F., no particular advantage is gained by further raising the temperature.

The compressed boards, when removed hot from the press, contain approximately 2% moisture. The rest of the original moisture content is lost as steam when the press is open. By adding about 4 to 5% moisture, as by spraying both sides of the panels after the panels have cooled down to less than 120° F., say to about 100° F., the panels or boards are rendered perfectly stable dimensionally at a relative humidity of 60 to 70% and dimensional changes at other relative humidities are reduced to such small values that they can be disregarded.

From the foregoing it will be apparent that we have provided an improved method for forming dense board from granulated or pulverized wood or other cellulose material.

The panels or boards prepared as disclosed hereinabove are made up of wood that has not been modified chemically to a significant extent and of resin in an amount of, say, from 6 to 7%. The boards will have about the same hygroscopic characteristics (tendency to absorb water) as the wood from which the boards have been prepared. The color of the boards is approximately the same as the wood contained therein. It should be noted, in this connection, that the color of the boards is uniform and does not vary locally, as contrasted to the different colors of the sap wood and heart wood of pine and to the local color variations in plywood. The boards prepared from a pressing mixture containing from 10% to 15% moisture at from 300 to 400 pounds pressure are characterized by moduli of rupture in static bending of from 4000 to 5000 pounds per square inch in all directions. With respect to strength in static bending, these boards are one-half as strong as solid wood, one-half as strong as 3-ply plywood with surface plys running in the long direction, and twice as strong as 3-ply plywood with surface plys running cross-wise. As to impact resistance these boards compare favorably with ¼ inch pine plywood or fir wood of equal thickness or with solid wood of equal thickness, and greatly exceed many conventional building boards. For comparison with the latter, our boards are distinguished by firmer edges that will not splinter like plywood nor dent as easily as plywood or solid lumber when the edges are treated roughly. The surface of our boards resist denting many times better than pine plywood or solid lumber. Our boards shrink or swell but little. For instance, a panel of 3-foot width will swell or shrink only about $\frac{1}{16}$ inch with a moisture change of 6%, while a pine plywood panel will swell or shrink $\frac{1}{32}$ inch and pine lumber panel will shrink or swell $\frac{7}{16}$ inch. Our boards are superior to plywood in resistance against warping and not as liable to damage on subjection to elevated temperatures. Our boards have surfaces excellently adapted to receive a finish, such as paint, being more absorptive so that the paint will be more firmly bonded thereto, and the paint coats do not show the hair line checks typical of painted veneers, and due to alternate transverse swelling and contraction of oriented cellulosic fibers. The initial paint coat applied to our boards yields a finish similar to painted metal. The surface of our boards accepts readily any color stain and the stain will not bring out any local color variations, as is the case with lumber or plywood. The boards may be treated to simulate natural wood grain and the staining characteristics of natural wood by the methods disclosed in our copending application Serial No. 100,004, filed June 18, 1949. Our boards are easily machined, with any wood-working machinery, and can consistently be produced with any desired hardness, color, size or other characteristics.

Changes in construction and procedure may be made without departing from the real spirit and purpose of our invention, and it is our intention to cover by our claims any modified forms which may be reasonably included within their scope without sacrificing any of the advantages thereof.

This application is a continuation-in-part of copending application Serial No. 59,903, filed November 13, 1948, now Patent No. 2,583,249, filed jointly by us with Merle W. Baker and Charles F. Curtis.

We claim as our invention:

1. In the method of preparing a cellulosic board which comprises providing a mixture comprising mechanically disintegrated wood and a resin-forming binder in an amount ranging from about 4% to about 14% by weight of said mixture, said mixture having a moisture content ranging from about 5% to about 25%, subjecting a layer of said mixture at an elevated temperature ranging from about 280° F. to 400° F. to a pressure ranging from about 150 to about 500 pounds per square inch for at least 3½ but less than 10 minutes, said pressure being correlated within said range with the moisture content of said mixture as tabulated:

| Moisture Content in Percent | Pressure in Pounds Per Square Inch | |
| --- | --- | --- |
| | Minimum | Maximum |
| 20–25 | 150 | 200 |
| 15–20 | 200 | 300 |
| 10–15 | 300 | 400 |
| 5–10 | 400 | 500 | said elevated temperature being maintained below 360° F. whenever said pressure amounts to at least 400 pounds per square inch, the margins of said layer being compressed more than the remainder of said layer to seal said remainder against moisture loss during the pressing operation, and thereafter slowly releasing said pressure to prevent blistering of the compressed board, the improvement comprising at the initiation of said pressing operation confining at least the lowermost stratum of said layer against lateral flow beyond a first predetermined area, also confining at least the uppermost stratum of said layer against lateral flow beyond a second predetermined area extending inside and spaced from said first area and while said layer is so confined subjecting said layer to said pressure over a third area intermediate in extent between said first and second areas while permitting at least limited displacement of said mixture outside said third area whereby air filling the voids in said mixture is expelled therefrom at the beginning of said pressing operation.

2. In a method of forming a dense board including compressing loose granular material having air-filled voids between the granules making up said material, the steps comprising depositing said material on a generally plane surface in an amount exceeding that required to constitute said board while confining at least the lowermost layer of the resulting bed of said material against lateral flow beyond a first predetermined area to build up said bed over said area to a height several times greater than the thickness of said board, confining at least the uppermost layer of said bed against lateral flow beyond a second predetermined area extending inside and spaced from said first area, and while said bed is so confined compressing said bed against said plane surface over a third area intermediate in extent between said first and second areas and encompassing a sufficient amount of said material to constitute said board while during said compression permitting at least limited displacement of material in said bed outside said third area.

3. The method of claim 2 in which said layer within said second area is of substantially uniform thickness.

4. The method of claim 2 in which said loose granular material comprises a mixture of disintegrated wood and a resin-forming binder, said layer containing from 5% to 25% moisture and at least 5% binder based upon the weight of the dry wood.

5. The method of claim 4 in which the pressure applied in said compressing step ranges from 150 to 500 pounds per square inch and being correlated within said range with the moisture content of said mixture as tabulated:

| Moisture Content in Percent | Minimum Pressure in Pounds Per Square Inch |
| --- | --- |
| 20–25 | 150 |
| 15–20 | 200 |
| 10–15 | 300 |
| 5–10 | 400 |

References Cited in the file of this patent

UNITED STATES PATENTS

| | | |
| --- | --- | --- |
| 912,284 | Collins | Feb. 16, 1909 |
| 2,044,213 | Irvine | June 16, 1936 |
| 2,057,377 | Gustin et al. | Oct. 13, 1936 |
| 2,193,847 | Strong | Mar. 19, 1940 |
| 2,348,081 | Linzell | May 2, 1944 |
| 2,367,822 | Brown | Jan. 23, 1945 |
| 2,402,554 | Irvine et al. | June 25, 1946 |
| 2,480,851 | Goss | Sept. 6, 1949 |
| 2,541,899 | Wellman | Feb. 13, 1951 |
| 2,574,915 | Fuller | Nov. 13, 1951 |
| 2,583,249 | Baker et al. | Jan. 22, 1952 |
| 2,583,618 | Weyerhaeuser | Jan. 29, 1952 |
| 2,619,681 | Baker et al. | Dec. 2, 1952 |